(12) United States Patent
Piccone et al.

(10) Patent No.: US 8,979,024 B2
(45) Date of Patent: Mar. 17, 2015

(54) SKID LANDING GEAR AND AN AIRCRAFT PROVIDED WITH SUCH LANDING GEAR

(75) Inventors: Jean-Francois Piccone, Cabries (FR); Francois Potdevin, Ventabren (FR)

(73) Assignee: Airbus Helicopters, Marignane Cedex (FR)

( * ) Notice: Subject to any disclaimer, the term of this patent is extended or adjusted under 35 U.S.C. 154(b) by 763 days.

(21) Appl. No.: 13/247,296

(22) Filed: Sep. 28, 2011

(65) Prior Publication Data
US 2012/0080560 A1     Apr. 5, 2012

(30) Foreign Application Priority Data
Oct. 5, 2010   (FR) ...................... 10 03939

(51) Int. Cl.
*B64C 25/52*     (2006.01)
*B64C 25/00*     (2006.01)
*B64C 25/32*     (2006.01)

(52) U.S. Cl.
CPC ........... *B64C 25/52* (2013.01); *B64C 2025/008* (2013.01); *B64C 2025/325* (2013.01)
USPC ...................................................... 244/108

(58) Field of Classification Search
CPC .............. B64C 2025/325; B64C 25/52; B64C 2025/008
USPC ................. 244/108, 17.17; 248/298.1, 299.1, 248/274.1, 288.11; 446/34, 36; 280/845
See application file for complete search history.

(56) References Cited

U.S. PATENT DOCUMENTS 3,173,632 A   3/1965   Woods
3,857,533 A   12/1974  Mason

FOREIGN PATENT DOCUMENTS

FR   2895368 A1   6/2007
SE   118333 C     3/1947

OTHER PUBLICATIONS

Search Report and Written Opinion; Application No. FR 1003939 dated; May 30, 2011.

*Primary Examiner* — Rob Swiatek
*Assistant Examiner* — Timothy Schwarz
(74) *Attorney, Agent, or Firm* — Brooks Kushman P.C.

(57) ABSTRACT

A landing gear (3) provided with first and second longitudinal bearing skids (4, 5) and with first and second transverse crossbars (6, 7). The landing gear includes at least one resilient fastener device (10) together with at least one blocking means (20) and at least one centering means (30) for each crossbar.

20 Claims, 2 Drawing Sheets

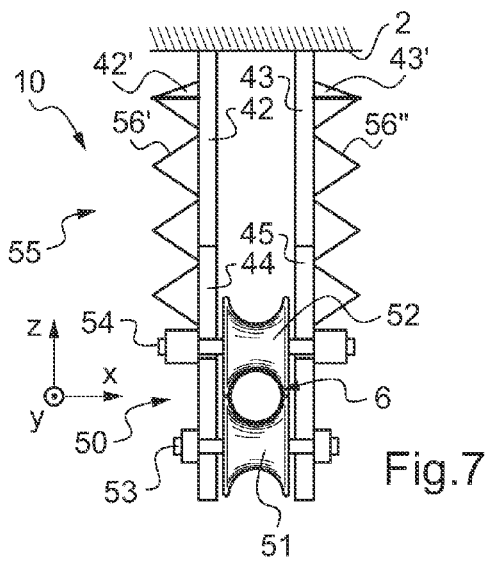
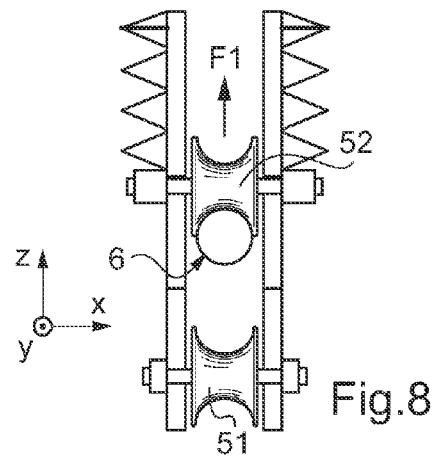
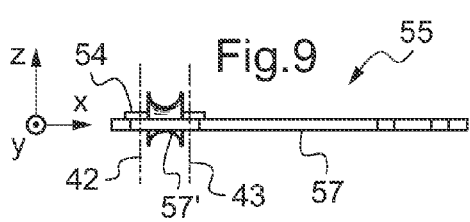
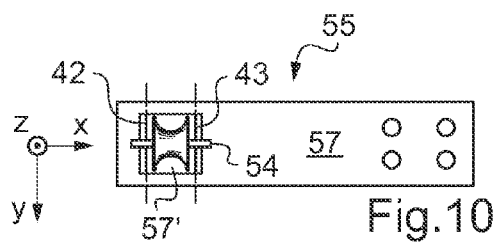
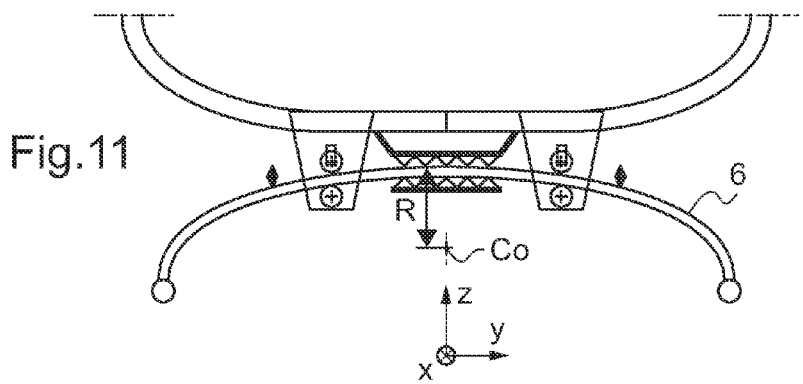
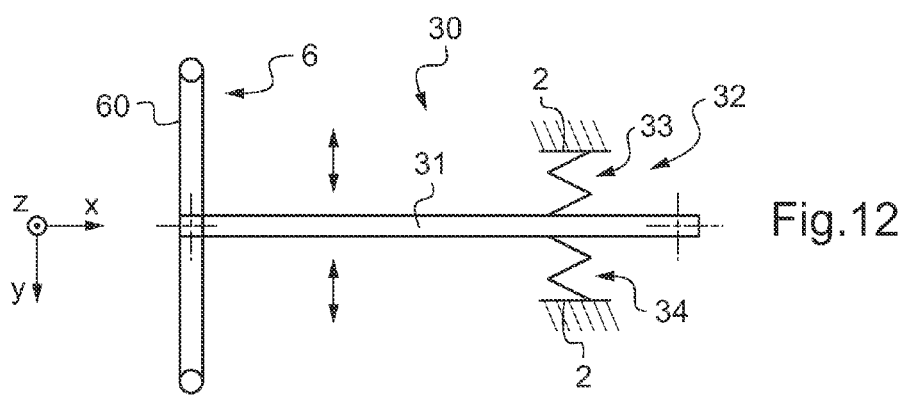

SKID LANDING GEAR AND AN AIRCRAFT PROVIDED WITH SUCH LANDING GEAR

CROSS REFERENCE TO RELATED APPLICATIONS

This application claims priority to FR 10 03939 filed on Oct. 5, 2010, the disclosure of which is incorporated in its entirety by reference herein.

BACKGROUND OF THE INVENTION (1) Field of the Invention

The present invention relates to skid landing gear and to an aircraft provided with such landing gear, in particular a rotorcraft.

(2) Description of Related Art

Conventionally, a rotorcraft includes landing gear via which the rotorcraft rests on the ground. More particularly, the landing gear may comprise so-called "skid" landing gear having first and second longitudinal bearing skids suitable for coming into contact with the ground and located on either side of the fuselage of the rotorcraft.

In addition, skid landing gear is usually provided with first and second transverse crossbars each connected to the first and second skids in order to connect the skids to the airframe of the aircraft.

The first crossbar is referred to as the "front" crossbar since the first crossbar connects the airframe to zones situated at the front ends of the first and second longitudinal skids. Conversely, the second crossbar is referred to as the "rear" crossbar insofar as the second crossbar connects the airframe to zones situated at the rear ends of the first and second longitudinal skids.

The landing gear is then fastened to the aircraft via its front and rear crossbars.

Such landing gear is very effective and enables a rotorcraft to land on multiple types of surface.

Nevertheless, landing on sloping ground can be difficult, in particular for an inexperienced pilot.

Using the landing procedure that is normally used when landing a helicopter on sloping ground, the pilot begins by hovering above the selected landing zone. The pilot then moves the helicopter towards the ground by reducing the collective pitch of the blades of the rotor until one skid touches the ground, which skid is referred to for convenience as the "uphill" skid.

The pilot then continues to reduce the collective pitch, while also modifying the cyclic pitch of the blades so as to keep the rotor disk substantially horizontal, i.e. perpendicular to the gravity axis.

It should be observed that if the slope of the ground is excessive, it is possible for the pilot to reach the maximum cyclic pitch of the blades, whereupon the pilot is obliged to take off in order to find some other landing zone.

When the downhill skid touches the ground in turn, the pilot verifies the quality of the trim of the helicopter on the ground by gently operating the rudder bar and the collective pitch lever. If the trim is acceptable, then the pilot ceases to act on the cyclic pitch of the blades and possibly reduces the speed of rotation of the power plant driving the rotor. In certain situations such as unloading passengers, it is advisable not to reduce the speed of rotation.

It can be understood that such a procedure requires special training for pilots.

Document U.S. Pat. No. 3,857,533 describes a helicopter provided with skid landing gear that makes it easier to land on sloping ground.

That landing gear possesses first and second skids that are connected together by front and rear crossbars. Each crossbar forms a circular arc with its concave side facing towards the ground, the concave surface of each of the crossbars including blocking catches.

The landing gear also includes guide means fastened to the helicopter airframe for co-operating with each of the crossbars, i.e. stationary wheels that allow the crossbars to move transversely when one of the skids touches the ground, with the wheels then revolving.

Finally, the landing gear includes active means for blocking the crossbars, i.e. fingers controlled by the collective pitch control of the aircraft so as to co-operate with the blocking catches of the crossbars.

Thus, when the helicopter lands on a slope, as soon as the uphill skid of the landing gear touches the ground, the reaction of the ground on the uphill skid causes the skids to move transversely. Under such circumstances, the landing gear pivots relative to the airframe of the helicopter.

Such pivoting comes to an end when the downhill skid touches the ground, in turn. Thus, the landing gear pivots to match the slope without the airframe of the helicopter tending to pivot as well, thus enabling the pilot to avoid acting on the cyclic pitch of the blades for the purpose of keeping the lift rotor horizontal.

Furthermore, by reducing the collective pitch of the blades with the collective stick lever, the pilot instructs the blocking means to engage in the blocking catches so as to prevent the airframe tilting sideways on the ground by freezing the position of the airframe relative to the landing gear.

Since the rotor is kept horizontal without acting on the cyclic pitch, landing is simplified and made safer compared with the above-described procedure.

Although effective, that landing gear requires the flight control to be coupled with the blocking means in order to block the landing gear on the ground. This results in a mechanical structure that is complicated and also in providing actuators and sensors, thereby running the risk of them failing.

Furthermore, it is found that after landing on sloping ground, the landing gear is off-center relative to the airframe of the helicopter and in particular relative to the anteroposterior plane of symmetry of the airframe. This results in unbalance of the aerodynamic drag of the landing gear during the flight undertaken after landing on sloping ground.

Furthermore, the pilot has no means for estimating the position of the landing gear relative to the airframe, and in particular the heights of the skids relative to the airframe. Under such circumstances, the pilot is in a disagreeable situation next time a landing is to be made. Furthermore, it can be understood that the pilot runs the risk of catching on an obstacle while moving in translation at very low altitude.

It should also be observed that the following documents are known: SE 118 333 C, FR 2 895 368 A1, and U.S. Pat. No. 3,173,632 A.

SUMMARY OF THE INVENTION

An object of the present invention is thus to propose landing gear that makes it possible to overcome the above-mentioned drawbacks by proposing landing gear that is simple and that is capable of allowing the pilot to know the exact position of the skids of the landing gear relative to the airframe when in flight.

According to the invention, landing gear is provided with a first longitudinal bearing skid and a second longitudinal bearing skid together with a first transverse crossbar and a second transverse crossbar, each connected to the first and second skids in order to connect each longitudinal bearing skid to an airframe of an aircraft.

The landing gear is remarkable in that it includes at least one resilient fastener device together with at least one blocking means and at least one centering means per crossbar, the fastener device for the associated crossbar including connection means for connecting the associated crossbar to the airframe and slide means for allowing the associated crossbar to slide relative to the connection means in a direction parallel to a transverse direction from the first skid towards the second skid while landing on sloping terrain, the blocking means being independent and acting to block the sliding of the associated crossbar relative to the connection means after landing on sloping terrain, the centering means acting in flight to position the associated crossbar in a predetermined position relative to the connection means.

It should be observed that the term "associated crossbar" means the crossbar co-operating with a fastener assembly having at least one fastener device together with at least one blocking means and at least one centering means. Thus, the first crossbar is the crossbar associated with the first fastener assembly and the second crossbar is associated with the second fastener assembly.

Each crossbar is then resiliently connected in flight to the airframe of the aircraft via at least one resilient fastener device, the crossbar being connected rigidly to said airframe by blocking means as a result of making a landing.

The fastener assembly of a crossbar may for example possess one blocking means and two fastener devices each co-operating with slide means, or indeed two blocking means and one fastener device co-operating with slide means, for example.

Under such circumstances, the invention provides a resilient fastener device that is suitable for allowing the crossbars and the longitudinal bearing skids to move after a skid has made contact with sloping ground.

Like document U.S. Pat. No. 3,857,533, such movement serves to simplify the procedure for landing. Nevertheless, unlike the teaching of that document U.S. Pat. No. 3,857,533, the invention makes provision in particular for a resilient fastener device together with independent blocking means, i.e. means that are independent of the flight controls of the aircraft, thereby enabling the installation to be simplified. Furthermore, the invention possesses centering means for centering the crossbars and the longitudinal bearing skids relative to the anteroposterior plane of symmetry of the aircraft while it is in flight, e.g. for the purpose of limiting the aerodynamic drag of the landing gear and of avoiding any pilot uncertainty about the real positions of the two skids.

Whatever the slope of the ground before making a flight, the first and second skids are arranged by the centering means in a position that is predetermined by the manufacturer.

The landing gear may include one or more of the following additional characteristics.

For example, the landing gear includes at least one lateral abutment arranged on a crossbar to limit the movement of the crossbar relative to the connection means during a landing on sloping terrain.

In an embodiment, two lateral abutments are provided arranged on either side of a fastener device. Contact between a lateral abutment and a fastener device serves to stop lateral movement of the crossbar.

Furthermore, at least one given crossbar comprises a central portion that is secured to a first portion secured to the first skid and a second portion secured to the second skid, said centering means comprising said central portion, said central portion presenting an arc of given radius about a center of curvature, the center of curvature being above said given crossbar when the landing gear is resting on horizontal ground.

Under such circumstances, the central portion presents a concave side facing the airframe of the aircraft. This characteristic enables the crossbar to be re-centered automatically by gravity once the skids are no longer touching the ground.

Furthermore, the centering means may comprise transverse return means, e.g. resilient return means, and a lever secured to the associated crossbar, the transverse return means tending to move the lever in order to position the associated crossbar in the predetermined position.

For example, the transverse return means may include two springs located on either side of the lever. When sloping ground exerts a force on the uphill skid, the crossbar moves relative to the airframe. This lateral movement of the crossbar stretches one of springs and compresses the other spring via the lever. In contrast, after the aircraft has taken off, each of the springs returns to its initial position, thereby moving the lever, and consequently returning the crossbar to said initial position.

In particular, any means equivalent to a spring, such as a block of elastomer or a spring blade, could be envisaged.

The lever may be combined with making use of a portion of the crossbar that has a center of curvature about said portion.

In addition, the blocking means may comprise a stationary portion suitable for being fastened to the airframe and a movable portion secured to the associated crossbar, the stationary portion and the movable portion co-operating by interfering shapes after a landing.

For example, the stationary portion includes catches and the movable portion includes teeth suitable for co-operating with the catches.

It should be observed that the terms "tooth" and "catch" should be understood broadly and cover shapes that are complementary, a "catch" having a female shape and a "tooth" having a male shape. A catch and/or tooth may include two sloping surfaces, or indeed lugs or pins, in particular.

In another aspect, the connection means comprise a fastener structure suitable for being fastened to the airframe, the slide means comprise a stationary wheel and a movable wheel co-operating with the fastener structure to connect the associated crossbar to the airframe, the associated crossbar passing between a stationary wheel and a movable wheel.

In flight, the crossbar is held between a stationary wheel and a movable wheel. However, while landing, the movable wheel is free to move in elevation and to allow the associated crossbar to be blocked transversely. The fastener device is then resilient insofar as it deforms depending on the stage of flight.

The fastener structure may support a stationary axle for the stationary wheel and a movable axle for the movable wheel, which axle slides in at least one slot extending in elevation in the fastener structure above the stationary wheel. For example, the fastener structure may comprise two parallel plates having respective guide slots, with the stationary axle being secured to each of the plates and the movable axle being arranged in the slot in each of the plates.

Furthermore, the slide means may optionally include elevation return means for returning the movable wheel and suitable for pressing the movable wheel against the associated crossbar. For example, the elevation return means may comprise a spring fastened both to the movable axle and to the fastener structure or to the airframe. A spring blade or a block of elastomer material could also be envisaged.

In addition to landing gear, the invention provides an aircraft including such landing gear.

According to the invention, an aircraft comprises an airframe and landing gear, the landing gear being provided with a first longitudinal bearing skid and a second longitudinal bearing skid, together with first and second transverse crossbars to connect each longitudinal bearing skid to said airframe.

In addition, the landing gear includes one or more of the above characteristics. In particular, the landing gear includes at least one resilient fastener device together with at least one blocking device and at least one centering means per crossbar, the fastener device for fastening the associated crossbar including connection means for connecting the associated crossbar to the airframe and slide means for allowing the associated crossbar to slide relative to the airframe during a landing on sloping terrain, the blocking means being independent to block sliding of the associated crossbar relative to the airframe following a landing on sloping terrain, the centering means acting in flight to position the associated crossbar in a predetermined position relative to the airframe.

For example, the landing gear may have two resilient fastener means on one crossbar and one resilient fastener means on the other crossbar in order to obtain a three-point fastener system, or indeed two resilient fastener means on each crossbar in order to obtain a four-point fastener system.

Depending on the variant, the landing gear is provided with at least two fastener devices associated with one crossbar and at least one fastener device associated with the other crossbar.

Furthermore, it should be observed that rotorcraft may be subjected to complex phenomena of ground resonance. The invention also presents the advantage of at least minimizing that phenomenon of ground resonance while landing.

During an initial stage of landing, the landing gear is connected to the airframe via resilient fastener devices and it is not rigidly connected to the airframe until the last stage of the landing, in which last stage the pilot reduces the cyclic and collective pitch controls. The vibration generated by the rotor via the airframe therefore does not subject the aircraft to the ground resonance phenomenon.

The resonant frequency in roll of the helicopter when standing on its landing gear is very low, and may even be close to zero hertz at the beginning of a landing, while the vibratory excitation from the rotor is still strong, given a relatively large collective pitch. The resonance frequency in roll rises when the crossbars become blocked laterally, however the risk of ground resonance is then reduced because the collective pitch is greatly reduced, thereby greatly reducing the amount of vibratory excitation it generates.

BRIEF DESCRIPTION OF THE DRAWINGS

The invention and its advantages appear in greater detail from the following description of embodiments given by way of illustration with reference to the accompanying figures, in which:

FIGS. 7 and 8 are sections of a fastener device provided with elevation return means in a first variant;

FIGS. 9 and 10 are views of elevation return means in a second variant; and

FIGS. 11 and 12 are views explaining the operation of landing gear in a second embodiment.

Elements that are present in more than one of the figures are given the same references in each of them.

DETAILED DESCRIPTION OF THE PREFERRED EMBODIMENTS

Figure 1:
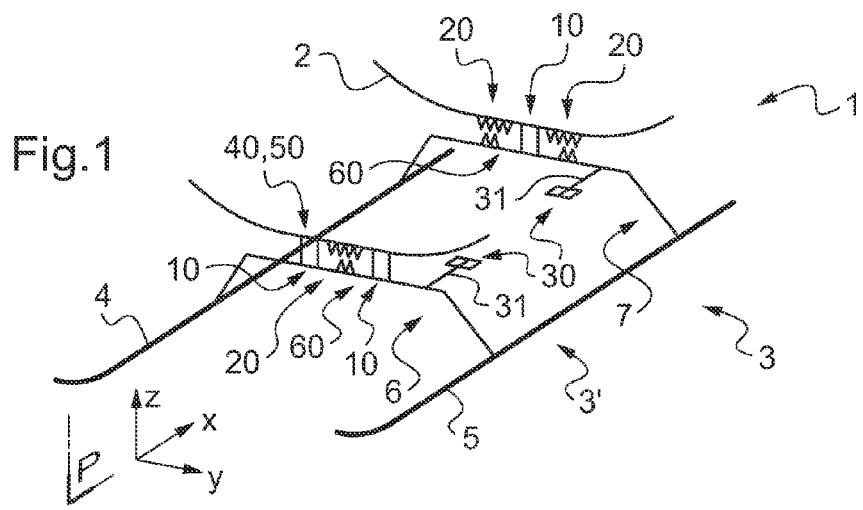
FIG. 1 is a diagrammatic view of an aircraft of the invention.
Figure 2:
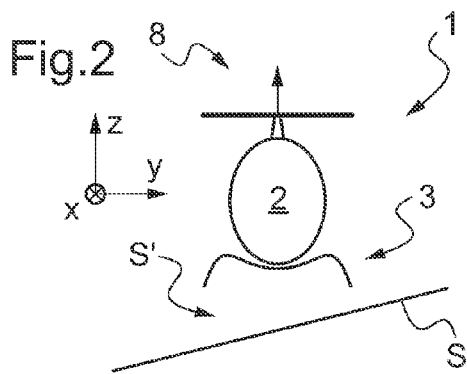
FIGS. 2 to 5 are diagrammatic sections explaining the operation of the invention.

It should be observed that three mutually orthogonal directions X, Y, and Z are shown in FIGS. 1 and 2.

The first direction X is said to be "longitudinal", the second direction Y is said to be "transverse", and the third direction Z is to said to be in "elevation".

FIG. 1 shows an aircraft 1 having an airframe 2 that is shown diagrammatically. The airframe 2 extends longitudinally along an anteroposterior plane of symmetry directed along the longitudinal direction X, transversely along the transverse direction Y, and in elevation along the elevation direction Z.

Furthermore, the aircraft 1 is provided with landing gear 3 on which the airframe 2 rests while on the ground. The landing gear 3 is provided with a carrier assembly 3' having first and second longitudinal bearing skids 4 and 5 that are parallel to each other and to the longitudinal direction X. The carrier assembly also possesses a first transverse crossbar 6 at the front and a second transverse crossbar 7 at the rear connecting each of the longitudinal bearing skids 4 and 5 to the airframe 2 of the aircraft 1.

Furthermore, the landing gear includes one fastener assembly for each crossbar, the fastener assembly having at least one resilient fastener device 10, together with at least one blocking means 20 and at least one centering means 30.

By way of example, the first crossbar 6 has two fastening points with the airframe 2, the landing gear has two fastener devices 10, one centering means 30, and one blocking means 20 that co-operates with the associated first crossbar 6.

In contrast, the second crossbar 7 has one fastener point with the airframe 2, the landing gear having one fastener device 10, one centering means 30, and two blocking means 20 that co-operate with the associated second crossbar 7.

Each resilient fastener device 10 of a crossbar serves to connect the crossbar to the airframe 2 via a connection that is suitable for enabling the crossbar to slide relative to the airframe 2 in a direction parallel to the transverse direction Y.

Under such circumstances, each fastener device 10 includes connection means 40 connecting the associated crossbar to the airframe 2. In addition, the fastener device 10 includes slide means 50 allowing said associated crossbar to move relative to the connection means 40 and thus to the airframe 2 while landing on sloping ground, and thus allowing the carrier assembly to move.

Furthermore, the blocking means 20 of a crossbar serve to block the lateral sliding of said crossbar relative to the corresponding connection means and to the airframe 2 after landing on sloping terrain.

The blocking means 20 are advantageously independent means, i.e. means that are passive and not managed by any auxiliary member such as a flight control, for example.

In another aspect, the centering means 30 of a crossbar serve in flight to position the crossbar in a predetermined position relative to the connection means 40 and to the airframe 2, e.g. relative of the anteroposterior plane P of symmetry of the aircraft 1.

FIGS. 2 to 6 show a helicopter type aircraft 1 having an airframe 2, the airframe 2 carrying a rotor 8 and resting on landing gear 3 of the invention.

With reference to FIG. 2, when the pilot has selected a landing zone S' on sloping ground S, the pilot reduces the collective pitch of the blades of the rotor 8 in order to make the aircraft 1 approach the ground.

Figure 3:
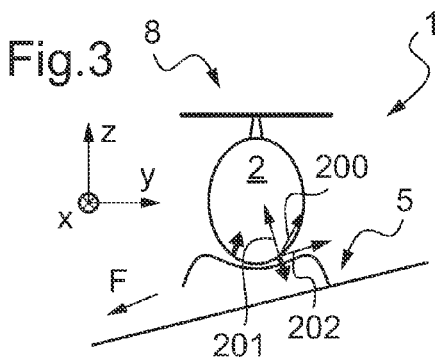

With reference to FIG. 3, when the uphill skid, i.e. the second skid 5 in the example shown, touches the ground S, the reaction from the ground S on the uphill skid 5 causes the carrier assembly of the landing gear 3 to slide along arrow F, i.e. the first and second crossbars together with the first skid 4 slide along arrow F.

As a result, the sliding causes the downhill skid to move closer to the ground S, specifically causing the first skid 4 to move in the example shown. The path followed by the first skid 4 is curved, i.e. substantially a circular arc.

Figure 4:
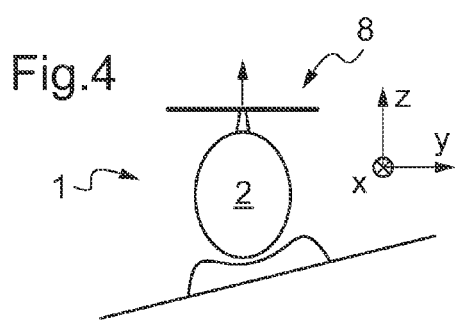

With reference to FIG. 4, on continuing to descend, the pilot causes the downhill skid to come into contact with the ground S.

Nevertheless, the pilot continues to reduce the collective pitch of the blades of the rotor 8. With the skids of the landing gear resting on the sloping ground, the airframe approaches said landing gear, thereby engaging the blocking means.

Figure 5:
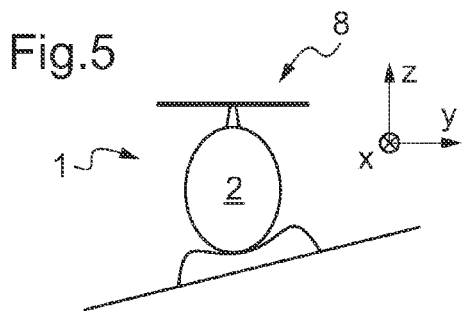

With reference to FIG. 5, the carrier assembly is then no longer capable of moving laterally relative to the airframe 2.

As explained below, the blocking means are completely independent and they do not require any control means to be used in order to perform their function.

Figure 6:
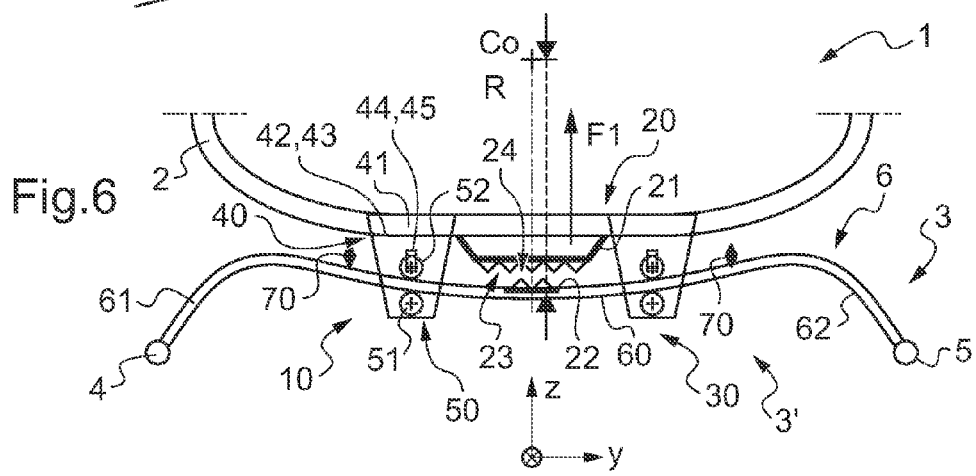
FIG. 6 is a section showing landing gear in a first embodiment.

FIG. 6 is a diagram of a first embodiment of the invention.

Independently of the embodiment, FIG. 6 shows two fastener devices 10.

Each fastener device 10 has one connection means 40. The connection means 40 possesses a fastener structure 41 for connecting the associated crossbar 6 to the airframe 2.

By way of example, and with reference to FIG. 7, the fastener structure 41 presents two mutually parallel fastener plates 42 and 43, each fastener plate 42 and 43 being secured to the airframe 2. The crossbar 6 associated with a fastener device 10 is then arranged inside the fastener structure 41, between the fastener plates 42 and 43.

Furthermore, the fastener device 10 includes slide means 50 co-operating with a crossbar 6 and with a fastener structure 41.

The slide means 50 are thus provided with a wheel referred to for convenience as a stationary wheel 51 insofar as its position relative to the airframe 2 and to the connection means 40 does not vary. Furthermore, the slide means 50 is provided with a wheel that is referred to for convenience as a movable wheel 52 insofar as its position relative to the airframe 2 and to the connection means 40 is variable.

Furthermore, an axis passing through the center of symmetry between the stationary wheel 51 and the movable wheel 52 and intersecting the corresponding crossbar at a point of intersection is perpendicular to the tangent of the crossbar passing via a point of intersection. The movable wheel 52 is then arranged substantially vertically above the stationary wheel 51, i.e. above the stationary wheel along said axis, the associated crossbar being arranged between the stationary wheel 51 and the movable wheel 52.

Consequently, the crossbar 6 is held in a space that is defined in elevation by the stationary wheel 51 and by the movable wheel 52, and longitudinally by a first plate 42 and a second plate 43.

The stationary wheel 51 co-operates for this purpose with the fastener structure 41. Under such circumstances, the connection means include a stationary axle 53 passing in succession through the first plate 42 of the fastener structure, through the stationary wheel 51, and then through the second plate 43 of the fastener structure, the stationary wheel 51 being free to rotate about the stationary axle 53.

Similarly, the movable wheel 52 co-operates with the fastener structure 41. Under such circumstances, the connection means include a movable axle 54 passing in succession through the first plate 42 of the fastener structure, through the movable wheel 52, and then through the second plate 43 of the fastener structure, the movable wheel 52 being free to rotate about the movable axle 54.

It can be understood that bearings or the equivalent may be arranged between each wheel and each plate in order to optimize mechanical operation thereof by reducing friction and wear, in particular.

Furthermore, the stationary axle 53 is securely attached to the fastener structure so as to be in a position that does not vary relative to said fastener structure 41.

Conversely, the movable axle 54 can slide relative to the fastener structure 41. For example, the movable axle passes through a first elongate slot 44 extending substantially along the elevation direction Z in the first plate 42 and through a second elongate slot 45 extending substantially along the elevation direction Z in the second plate 43 so as to be capable of moving in translation along said direction that is substantially in elevation Z. The first and second slots are optionally arranged along the above-mentioned axis.

In order to dimension the first and second slots, it should be observed that the movable axle is located at a first end of the first and second slots when the movable wheel presses the crossbar against the stationary wheel, said axle occupying a second end position in the first and second slots when the blocking means are engaged.

Finally, the slide means shown comprise elevation return means 55 for continuously pressing the movable wheel 52 against the associated crossbar. For example, the elevation return means 55 possess at least one spring 56', 56" connecting the movable axle 54 to a projecting rim 42', 43' of the fastener structure in the embodiment shown, or indeed to the airframe 2.

It can be understood that it is possible to use any other means capable of returning to its original shape after stress has been applied thereto, e.g. a block of elastomer.

In the variant shown in FIGS. 9 and 10, the elevation return means comprise a spring blade 57 carrying the movable axle 54. The plates 42 and 43 of the fastener structure 41 and the movable wheel 52 then penetrate through an orifice 57' in the spring blade 57.

Whatever the variant, the pressure exerted in flight by the elevation return means 55 on the movable wheel 52 serves to keep the crossbar 6 in contact with the movable wheel 52 and with the stationary wheel 51 in each associated fastener device.

With reference to FIG. 7, when the uphill skid touches sloping ground while landing, the reaction from the ground on the uphill skid is not sufficient to move the movable wheel in translation.

As seen from a fastener structure 41, the ground reaction is equivalent to a reaction force 200 together with a reaction moment.

This reaction force can be resolved into a first force 201 perpendicular to the crossbar and a second force 202 tangential to the crossbar, as shown in FIG. 3.

The first force is balanced by the reaction from the fastener device, the reaction moment being balanced by the reactions from the set of devices for fastening a crossbar.

In contrast, the second force is not balanced, and it causes the crossbar to slide laterally.

The crossbar 6 then moves relative to the airframe of the aircraft, while being guided between each movable wheel and the corresponding stationary wheel.

With descent continuing, the downhill skid touches the ground in turn.

With reference to FIG. 8, by reducing the collective pitch, the pilot causes the lift from the rotary wing to drop below a threshold that implies that the airframe will approach the crossbars. The movable wheels are then no longer capable of preventing each of the crossbars from moving towards the airframe along arrow F1. Thus, at the end of this approach movement, the blocking means are activated so as to lock the landing gear in position relative to the airframe.

Thus, during a first stage of landing, the movable and stationary wheels act together to guide movement in translation of each crossbar relative to the airframe. In contrast, during a second stage of landing that follows both skids of the landing gear being placed on the ground, the movable wheels can no longer oppose the crossbars moving towards the airframe, and consequently the crossbars become rigidly blocked by the blocking means.

FIG. 6 shows one such blocking means 20.

The blocking means 20 comprise a stationary portion 21 secured to the airframe 2 and a movable portion 22 secured to the associated crossbar 6. When the transverse movement of the associated crossbar 6 along arrow F1 reaches a maximum threshold, the stationary and movable portions 21 and 22 co-operate with each other by means of interfering shapes to as to block the crossbar 6.

For example, the stationary portion 21 has catches 23 and the movable portion 22 has teeth 24 suitable for being inserted in the catches 23.

The stationary and movable portions 21 and 22 are dimensioned so as to obtain interference between shapes regardless of the transverse position of the stationary portion 21 relative to the transverse position of the movable portion 22.

Other blocking means could be envisaged, such as blocking means of the type used on declutchable ski-lifts or on locking pliers.

Furthermore, the landing gear optionally includes means for limiting the transverse movement of the crossbar relative to the airframe.

These limit means may comprise at least one lateral abutment 70 interrupting transverse movement of the crossbar by interfering with a fastener device.

The lateral abutment 70 may be a dedicated member arranged on the crossbar or it may be an element of the moving portion 22 of the blocking means, for example.

Furthermore, the landing gear 3 possesses one centering means 30 for each crossbar of the carrier assembly of the landing gear 3 for centering it in flight.

In the first embodiment shown in FIG. 6, the means for centering a given crossbar are obtained solely with a portion of said given crossbar.

Such a given crossbar comprises in succession a first portion 61 fastened to the first skid 4, a central portion 60, and then a second portion 62 fastened to the second skid 5.

The central portion 60 is in the form of an arc of given radius R about a center of curvature Co, the center of curvature Co being above the given crossbar when the landing gear is resting on horizontal ground. Under such circumstances, the central portion presents a concave side facing towards the airframe 2.

As soon as the ground is no longer exerting force on the skids, the particular shape of the central portion enables the support element 3' of the landing gear 3 to be re-centered.

It should be observed that half of the lateral movement of the crossbar is equal to the slope of the ground measured in radians and multiplied by said radius R of the central portion. For a predetermined maximum slope, an optimum radius R and lateral movement pair is determined as a function of the available space, in particular.

For example, for a slope of 12°, it is possible to use a crossbar having a central portion presenting an arc with a radius of three meters and suitable for moving laterally through plus or minus 63 centimeters on either side of an equilibrium position.

FIGS. 11 and 12 show a second embodiment.

In this second embodiment, the central portion 60 presents an arc of given radius R about a center of curvature Co, this arc being located above the center of curvature Co when the landing gear is resting on horizontal ground. Under such circumstances, in this configuration the central portion presents a concave side facing the ground.

This geometrical shape does not enable the crossbar to be re-centered automatically.

Thus, with reference to FIG. 12, the centering means 30 comprise a lever 31 secured to the associated crossbar 6 and to transverse return means 32.

The transverse return means 32 comprise first and second return members 33 and 34 surrounding the lever 31 and fastened to the airframe 2.

In flight, the transverse return means 32 tend to move the lever and consequently the crossbar 6 into a predetermined position.

It can be understood that the first and second embodiments may be combined.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A landing gear comprising a first longitudinal bearing skid and a second longitudinal bearing skid together with a first transverse crossbar and a second transverse crossbar each connected to the first and second skids in order to connect each longitudinal bearing skid to an airframe of an aircraft, wherein the landing gear includes at least one resilient fastener device together with at least one blocking means and at least one centering means per crossbar, the fastener device for the associated crossbar including connection means for connecting the associated crossbar to the airframe and slide means for allowing the associated crossbar to slide relative to the connection means while landing on sloping terrain, the blocking means being independent and acting to block the sliding of the associated crossbar relative to the connection means after landing on sloping terrain, the centering means acting in flight to position the associated crossbar in a predetermined position relative to the connection means, wherein the blocking means comprise a stationary portion suitable for being fastened to the airframe and a movable portion secured to the associated crossbar, the stationary portion and the movable portion co-operating by interfering shapes after a landing.

2. The landing gear according to claim 1, including at least one lateral abutment arranged on at least one of the transverse crossbars to limit the movement of the crossbar relative to the connection means during a landing on sloping terrain.

3. The landing gear according to claim 1, wherein at least one given crossbar comprises a central portion that is secured to a first portion fastened to the first skid and a second portion fastened to the second skid, the centering means comprising the central portion, the central portion presenting an arc of given radius (R) about a center of curvature (Co), the center of curvature (Co) being above the given crossbar when the landing gear is resting on horizontal ground.

4. The landing gear according to claim 1, wherein the centering means comprise transverse return means and a lever secured to the associated crossbar, the transverse return means tending to move the lever in order to position the associated crossbar in the predetermined position.

5. The landing gear according to claim 1, wherein the stationary portion includes catches and the movable portion includes teeth suitable for co-operating with the catches.

6. The landing gear according to claim 1, wherein the connection means comprise a fastener structure suitable for being fastened to the airframe, the slide means comprise a stationary wheel and a movable wheel co-operating with the fastener structure to connect the associated crossbar to the airframe, the associated crossbar passing between the stationary wheel and the movable wheel.

7. The landing gear according to claim 6, wherein the fastener structure supports a stationary axle for the stationary wheel and a movable axle for the movable wheel, wherein the movable axle slides in at least one slot extending in elevation in the fastener structure above the stationary wheel.

8. The landing gear according to claim 7, wherein the slide means include elevation return means for returning the movable wheel and suitable for pressing the movable wheel against the associated crossbar.

9. An aircraft comprising an airframe and landing gear, the landing gear being provided with a first longitudinal bearing skid and a second longitudinal bearing skid, together with first and second transverse crossbars connecting together each of the first and second skids in order to connect each longitudinal bearing skid to the airframe, wherein the landing gear includes at least one resilient fastener device together with at least one blocking device and at least one centering means per crossbar, the fastener device for fastening the associated crossbar including connection means for connecting the associated crossbar to the airframe and slide means for allowing the associated crossbar to slide relative to the airframe during a landing on sloping terrain, the blocking device being independent to block sliding of the associated crossbar relative to the airframe following a landing on sloping terrain, the centering means acting in flight to position the associated crossbar in a predetermined position relative to the airframe, wherein the blocking device comprises a stationary portion suitable for being fastened to the airframe and a movable portion secured to the associated crossbar, the stationary portion and the movable portion co-operating by interfering shapes after a landing.

10. The aircraft according to claim 9, including at least one lateral abutment arranged on at least one of the transverse crossbars to limit the movement of the crossbar relative to the connection means during a landing on sloping terrain.

11. The aircraft according to claim 9, wherein at least one given crossbar comprises a central portion that is secured to a first portion fastened to the first skid and a second portion fastened to the second skid, the centering means comprising the central portion, the central portion presenting an arc of given radius (R) about a center of curvature (Co), the center of curvature (Co) being above the given crossbar when the landing gear is resting on horizontal ground.

12. The aircraft according to claim 9, wherein the centering means comprise transverse return means and a lever secured to the associated crossbar, the transverse return means tending to move the lever in order to position the associated crossbar in the predetermined position.

13. The aircraft according to claim 9, wherein the connection means comprise a fastener structure suitable for being fastened to the airframe, the slide means comprise a stationary wheel and a movable wheel co-operating with the fastener structure to connect the associated crossbar to the airframe, the associated crossbar passing between the stationary wheel and the movable wheel.

14. A landing gear comprising a first longitudinal bearing skid and a second longitudinal bearing skid together with a first transverse crossbar and a second transverse crossbar each connected to the first and second skids in order to connect each longitudinal bearing skid to an airframe of an aircraft, wherein the landing gear includes at least one resilient fastener device together with at least one blocking means and at least one centering means per crossbar, the fastener device for the associated crossbar including connection means for connecting the associated crossbar to the airframe and slide means for allowing the associated crossbar to slide relative to the connection means while landing on sloping terrain, the blocking means being independent and acting to block the sliding of the associated crossbar relative to the connection means after landing on sloping terrain, the centering means acting in flight to position the associated crossbar in a predetermined position relative to the connection mean; wherein at least one given crossbar comprises a central portion that is secured to a first portion fastened to the first skid and a second portion fastened to the second skid, the centering means comprising the central portion, the central portion presenting an arc of given radius (R) about a center of curvature (Co), the center of curvature (Co) being above the given crossbar when the landing gear is resting on horizontal ground.

15. The landing gear according to claim 14, including at least one lateral abutment arranged on at least one of the transverse crossbars to limit the movement of the crossbar relative to the connection means during a landing on sloping terrain.

16. The landing gear according to claim 14, wherein the centering means comprise transverse return means and a lever secured to the associated crossbar, the transverse return means tending to move the lever in order to position the associated crossbar in the predetermined position.

17. The landing gear according to claim 14, wherein the blocking means comprise a stationary portion suitable for being fastened to the airframe and a movable portion secured to the associated crossbar, the stationary portion and the movable portion co-operating by interfering shapes after a landing, and wherein the stationary portion includes catches and the movable portion includes teeth suitable for co-operating with the catches.

18. The landing gear according to claim 14, wherein the connection means comprise a fastener structure suitable for being fastened to the airframe, the slide means comprise a stationary wheel and a movable wheel co-operating with the fastener structure to connect the associated crossbar to the airframe, the associated crossbar passing between the stationary wheel and the movable wheel.

19. The landing gear according to claim 18, wherein the fastener structure supports a stationary axle for the stationary wheel and a movable axle for the movable wheel, wherein the movable axle slides in at least one slot extending in elevation in the fastener structure above the stationary wheel.

20. The landing gear according to claim 19, wherein the slide means include elevation return means for returning the movable wheel and suitable for pressing the movable wheel against the associated crossbar.

\* \* \* \* \*